United States Patent [19]

Erhan et al.

[11] Patent Number: 5,122,188

[45] Date of Patent: Jun. 16, 1992

[54] VEGETABLE OIL-BASED PRINTING INK

[75] Inventors: Sevim Z. Erhan, Peoria; Marvin O. Bagby, Morton, both of Ill.

[73] Assignee: The United States of America, as represented by the Secretary of Agriculture, Washington, D.C.

[21] Appl. No.: 519,197

[22] Filed: May 3, 1990

[51] Int. Cl.⁵ .................. C09D 11/06; C08L 91/00; C09F 7/00
[52] U.S. Cl. .................. 106/28; 106/250; 106/251; 106/252; 106/253; 106/266
[58] Field of Search .................. 106/27, 28, 250, 251, 106/252, 253, 266

[56] References Cited

U.S. PATENT DOCUMENTS

| | | | |
|---|---|---|---|
| 2,043,397 | 6/1936 | Shaw | 106/28 |
| 2,073,229 | 3/1937 | Shuey | 106/28 |
| 2,291,293 | 7/1942 | Curtis | 106/28 |
| 2,310,419 | 2/1943 | Ginn | 106/28 |
| 2,762,712 | 9/1956 | Bloch et al. | 106/28 |
| 2,794,747 | 6/1957 | Bloch | 106/28 |
| 3,041,203 | 6/1962 | Sites et al. | 106/28 |
| 3,050,413 | 8/1962 | Sites et al. | 106/28 |
| 3,051,591 | 8/1962 | Sites et al. | 106/28 |
| 3,052,568 | 9/1962 | Sites et al. | 106/28 |
| 4,045,232 | 8/1977 | Parkinson | 106/28 |
| 4,419,132 | 12/1983 | Moynihan | 106/27 |
| 4,519,841 | 5/1985 | Moynihan | 106/27 |
| 4,554,019 | 11/1985 | Moynihan | 106/27 |

OTHER PUBLICATIONS

Tetsuo Ono, "Hot-Melt Copying Inks," Chem. Abstracts 106: 6601a (1987).

Masayuki Kuzuwata, "Stencil Printing Inks," Chem. Abstracts 110: 175285p (1989).

Pramod Kumar Gupta, "Black Ink for Stamp Cancellation," Chem. Abstracts 104: 90694x (1986).

Milton Richlin et al., "Vehicles for Printer Ribbon Inks," American Ink Maker 00: 14,16,18,48 (May 1987).

Seitaro Kobayashi, "Discharge Printing by Offset Printing," Chem. Abstracts 89: 112189n (1978).

. . . , "Ingredients in Printing Ink," Chapter 3 in Printing Ink Handbook, Fifth Edition, National Association of Printing Ink Mfg., Inc. (1988).

. . . , The Printing Ink Manual, Third Edition, ed. D. E. Bisset et al., Northwood Books, London, 1979, p. 250, cover & title pages.

Paul J. Hartsuch, Chemistry for the Graphic Arts, Philadelphia, Pa. 1979, p. 220, cover & title pages.

Louis M. Larsen, Industrial Printing Inks, Reinhold Publishing Corporation, New York, 1962, pp. 82-85, cover & title pages.

ADM Chart: Linseed Oils, Soybean Oils, Marine Oils, Lecithins, Misc. Oils, no date available, 7 pp.

Primary Examiner—Mark L. Bell
Assistant Examiner—Helene Klemanski
Attorney, Agent, or Firm—M. Howard Silverstein; John D. Fado; Curtis P. Ribando

[57] ABSTRACT

Printing inks, which do not require any petroleum-derived component, are prepared from vegetable oils by heat bodying the oils to within a specified viscosity range. The process is easily tailored to give products having viscosity, tackiness, ruboff resistance, and color density properties which meet or exceed industry standards. The inherent light coloration of the vehicles permits formulation into colored inks having substantially reduced pigment levels.

21 Claims, No Drawings

VEGETABLE OIL-BASED PRINTING INK

BACKGROUND OF THE INVENTION

1. Field of the Invention

In the printing industry, the processes in current use include lithography (52% share of the industry), gravure (18%), flexography (19%), letterpress (5%), and screen printing and other miscellaneous processes (6%).

Printing inks that are conventionally used in these applications are multicomponent systems comprising: (1) the pigment; (2) a hydrocarbon and/or alkyd resin; (3) a hydrocarbon solvent; and (4) optional additives. For example, a typical petroleum-based, black, litho-news ink would be comprised of 15-20% carbon black as the pigment, 15-25% hydrocarbon or alkyd resin, and 50-70% mineral oil solvent. Nearly 500 million kilograms of inks for these applications are produced domestically each year. This volume of production represents a substantial consumption of a petroleum-based fraction. The petroleum oil shortage in the mid 1970's stimulated research to find alternatives to mineral oil and other petroleum products in ink formulations.

This invention relates to vegetable oil-based inks which do not require petroleum products and which possess the desirable properties for most printing ink applications.

2. Description of the Prior Art

Inks containing vegetable oils have been formulated for various specialized applications. For example, Ono et al. [Japanese Kokai Tokkyo Koho JP 61/123,681] show hot-melt copying inks comprising a pigment in a nondrying vegetable oil and vegetable wax base. Kuzuwata [Japanese Kokai Tokkyo Koho JP 63/277,287] teach stencil printing inks comprising a minor proportion of vegetable oil in a predominantly water-based formulation. Gupta et al. [Indian Patent IN 154,760] report an ink for stamp cancellation containing inedible vegetable oils, dispersing agents, and pigments.

Vegetable oils polymerized by oxygenation were evaluated for use as vehicles for typewriter and printer ribbon inks by Richlin et al. [Amer. Ink Maker 65(5): 14-18, 48 (May 1987)]. Also, a vehicle comprising a blend of ester gum, alkyd, cetanol, and vegetable oil for use in discharge printing of fabrics has been taught by Kobayashi [Japanese Patent 78/17,716].

In the early 1980's, the American Newspaper Publishers Association (ANPA) directed a research effort on developing a nonpetroleum-based vehicle for news-inks. A series of ink formulations were patented by Moynihan comprising a blend of "gilsonite" (uintaite) and tall oil fatty acids together with carbon black pigment. U.S. Pat. No. 4,419,132 relates to a printing ink comprising 16.5-21.5% carbon black, 16.4-25.1% "gilsonite", and 54.9-64.4% tall oil fatty acid. U.S. Pat. No. 4,554,019 is drawn to a letterpress ink having 6.0-19.8% carbon black, 16.4-26.3% "gilsonite", and 52.7-70.5% tall oil fatty acid. The offset printing ink of U.S. Pat. No. 4,519,841 comprises 10-27.8% carbon black, 17.6-23.5% "gilsonite", and 50.1-54.9% tall oil fatty acid. Acceptance of these inks by the industry has been limited by the cost and availability of tall oil and the difficulty of equipment cleanup caused by the "gilsonite". A later approach by ANPA to produce a vegetable oil-based ink vehicle resulted in a lithographic newsink comprising 50-60% alkali-refined soybean oil, 20-25% of a hydrocarbon resin ("Picco 5140"), and about 20% carbon black pigment. Widespread commercial acceptance of this ink has been inhibited by the cost, which is 50-70% more than traditional petroleum-based black inks.

Despite advances in the art made by the ANPA and others, the industry has continued to seek a nonpetroleum-based printing ink vehicle which would: (1) be cost competitive with petroleum-based inks; (2) not require any petroleum-derived component; (3) resist ruboff on hands and clothing; and (4) enable formulation over a wide range of viscosities required by various printing applications.

SUMMARY

We have now succeeded in making vegetable oil-based printing ink vehicles having all of the aforementioned characteristics. These vehicles are prepared by thermal transformation of the vegetable oil starting material by a process known as "heat bodying". The process can be easily tailored to give products having a range of properties (e.g., viscosity, tackiness, etc.) enabling use for formulating inks having a variety of end use applications. The exceptionally light color of the vehicles permits formulation into colored inks having substantially reduced levels of pigment as compared to industry standards. The vehicles are, of course, completely compatible with carbon black useful in formulating black inks.

In accordance with this discovery, it is an object of the invention to produce vegetable oil-based printing ink vehicles which do not require any petroleum component.

It is also an object of this invention to provide printing inks and vehicles derived from a renewable resource, and particularly from an agricultural product.

Another object of the invention is to provide vegetable-based printing inks which meet or exceed industry standards in regard to ruboff resistance, viscosity, and tackiness for a variety of printing applications.

A further object of the invention is to provide a competitively priced alternative to petroleum-based inks.

An additional object of the invention is to provide a facile, low-cost process for producing inks having the aforementioned characteristics and advantages.

Other objects and advantages of the invention will become readily apparent from the ensuing description.

DETAILED DESCRIPTION OF THE INVENTION

Yhe vegetable oils for use in the printer ink vehicles of the invention are the commonly available vegetable triglycerides in which the preponderance of the fatty acid ester moieties have a chain length of 18 or more carbon atoms. Or particular interest are those which have a substantial proportion of the diunsaturated linoleic fatty acid and triunsaturated linolenic fatty acid moieties. Exemplary vegetable oils contemplated herein are soybean, cottonseed, linseed, safflower, sunflower, corn, sesame, canola (rapeseed) and peanut.

Though the aforementioned oils may be employed in the crude state as originally expressed from the seed material, there are advantages to subjecting them to certain preliminary processing steps. For example, alkali refining removes the gums and phospholipids which may interfere with the properties of the vehicles and the ultimate ink formulations. Alkali refining also removes free fatty acids, which tend to reduce hydrophobicity properties desired in certain ink formulations.

As previously stated, the subject vehicles are prepared by thermal transformation of the vegetable oil starting material by a process known as "heat bodying". In general, the oil is heated with mixing to a suitable temperature to promote an increase in the viscosity of the oil. It is generally accepted that the process of heat bodying promotes polymerization of the vegetable oils. Without desiring to be bound to any particular theory of operation, it is our belief that the heat treatment causes conjugation of conjugatable double bonds, and that inter- and intrapolymers are formed by virtue of cyclization involving conjugated double bonds of one fatty acid ester moiety and a point of unsaturation on another moiety.

The temperature of heating is preferably selected to minimize the length of time required to achieve the desired reaction without causing substantial degradation of the oil or its reaction products. A temperature range of about 275°-340° C. is suitable for most oils, with a range of about 325°-335° C. being preferred. By conducting the heat bodying reaction in nitrogen or other suitable inert atmosphere, oxidation and its consequent darkening effect on the oil are minimized. It is contemplated that catalysts, such as anthroquinone, or elevated pressures can be used to accelerate the rate of conjugation and thereby reduce the time period for heat bodying. The catalyst can then be recovered and subsequently reused.

Two variations in the basic heat bodying process described above have been developed for preparing vehicles within the ambit of the invention. What will hereafter be referred to as a "Type I" vehicle is prepared by heat bodying the starting oil under the conditions specified above until the oil attains the viscosity desired for a predetermined application; namely, the formulation of a printing ink having particular end use properties. Vehicles for use in accordance with the invention will typically have viscosities having values in the range of G-Y on the Gardner-Holdt Viscometer Scale, or about 1.6-18 poises. These viscosities correspond to molecular weights of about 2600-8900. The correlation between Gardner-Holdt viscosities and poises is given in Table 12.4 of Bailey's Industrial Oil and Fat Products, 3rd Edition, page 513, herein incorporated by reference.

A "Type II" vehicle is a two-component mixture. In the preparation of the first component, a vegetable oil is heat bodies according to the Type I process, except that heating is continued until the oil gels. The distinction between the thickened polymerized oil and the gel is visually apparent, and is manifest by "clumps" of the vehicle riding up on the stirring apparatus. It is preferred to terminate the reaction at the point of gel transition. Molecular weights of these gels range from about 15,000 for those derived from sunflower seed oil to about 60,000 for those from soybean oil. The gel is blended with unmodified vegetable oil (the second component) in suitable proportions to yield a vehicle of the desired viscosity. Heating the mixture in an inert atmosphere up to about 340° C. for a short time softens the gel and facilitates blending. Dissolution of the gel component in the oil under these conditions tends to be complete, obviating the need for filtration. The principal advantage of the Type II vehicle is that the gel can be prepared and stored as a stock material for subsequent custom blending of vehicles over a broad viscosity range.

Both the Type I and Type II vehicles are characterized by an exceedingly light coloration. They have a value on the Gardner Color Scale of about 6 or less, and typically in the range of about 2-4. This property permits a substantial reduction in the amount of pigment required for colored inks as compared to the pigment levels required by commercial vehicles having Gardner Color Scale values exceeding 12 or 13.

Variations of the Type I and Type II vehicles would be within the skill of a person in the art. For example, a minor portion of the unmodified vegetable oil starting material could be replaced with air-blown oil which is already partially polymerized. However, oxidation resulting from the air-blown process tends to darken the oil and the resulting blend. It is also possible to blend heat bodied oils of different viscosities in order to produce a particular vehicle viscosity.

inks are prepared from the aforementioned vehicles by formulation with pigment and miscellaneous additives as required for the prospective application. The vegetable oil vehicles of the invention are compatible with the pigments for producing the four colors commonly used in the printing industry; namely, black, cyan (blue), magenta (red), and yellow. The amount of pigment in the formulation will typically be in the range of about 6-25% (w/w). However, due to the light coloration of the vehicle, acceptable color densities are normally achievable at pigment levels in the range of about 6-15% (w/w). The pigment is blended into the vehicle by means of any conventional mixing apparatus until a uniform dispersion is obtained. Additives which may be formulated into the inks include driers, lubricants, antioxidants, surface-active agents, and the like. Determination of the amounts of these additives would be within the skill of a person in the art.

The thickening effect of the pigment on the base vehicle is considered in preselecting a vehicle viscosity. Inks prepared in the examples, below, are characterized by viscosities in the range of about 5-42 poises and tacks in the range of about 2-7 g-m. The typical viscosity for a black offset newsink is in the range of about 13-24 poises, and about 5-12 poises for a black letterpress newsink. Tack values for the offset ink are about 3.5-4.8 g-m, and about 2.6-3.4 g-m for the letterpress. Inks of the invention having these properties are also characterized by acceptable or superior ruboff values and easy cleanup from printing equipment. Moreover, lithographic inks demonstrate an acceptable range of water takeup in water tolerance tests.

It is understood that the foregoing detailed description is given merely by way of illustration and that modification and variations may be made therein without departing from the spirit and scope of the invention.

EXAMPLE 1

Alkali-refined soybean oil (300-1600 ml) was placed in a 0.5-2 L four-necked reaction flask equipped with a "Jiffy Mixer" stirrer. The oil was heated at 330°±3° C. under a nitrogen atmosphere from 1-2.5 hrs until the desired viscosity in the range of G (1.65 P) to Y (17.6 P) on the Gardner-Holdt Viscosity Scale was reached. The soybean oil-based vehicles prepared by this procedure were designated "SOY I (a1)". Individual viscosity values are given in Table V below.

EXAMPLE 2

The procedure of Example 1 was repeated except the reaction was conducted in a four-necked reaction flask equipped with either a dean-stark trap or a reflux condenser to recover any oil that might be entrained with the nitrogen gas flow. The soybean oil-based vehicles prepared by this procedure were designated "SOY I (a2)". Individual viscosity values are given in Table V below.

EXAMPLE 3

The procedure of Example 1 was repeated except the temperature was 300°±3° C. and 5% by weight anthraquinone catalyst was added to the oil. Heating was terminated when the desired viscosity was reached. The catalyst shortened the heat bodying time by about 10–20%. The heat bodied oil was allowed to cool to room temperature and was then filtered to remove the precipitated catalyst. The soybean oil-based vehicles prepared by this procedure were designated "SOY I (b1)". Individual viscosity values are given in Table V below.

EXAMPLE 4

SOY I (a1) vehicles prepared as described in Example 1, but in some cases having Gardner-Holdt viscosities as high as $Z_8 14 Z_9$, were admixed with other SOY I (a1) vehicles and/or unmodified, alkali-refined soybean oil at 65°–75° C. in a reaction flask equipped with a "Jiffy-Mixer" mechanical stirrer. The component proportions and viscosities of six vehicles prepared by this procedure are set forth in Table I below. Soybean oil-based vehicles prepared by this procedure were designated "SOY I(c1-6)".

EXAMPLE 5

The procedure of Example 1 was repeated except the reaction was allowed to proceed until the oil was converted to a gel (factice). The reaction was discontinued at the transition point when clumps of gel began to climb up the shaft of the mechanical stirrer.

This gel was then blended in a four-necked reaction flask equipped with a "Jiffy-Mixer" stirrer in various ratios with unmodified alkali-refined soybean oil at 330°±3° C. under a nitrogen atmosphere. The purpose of heating was to soften the gel in order to promote blending. Agitation was continued until a smooth vehicle was obtained. The resultant vehicle viscosities, as determined by the proportions of the gel and unmodified oil, are set forth in Table V below. The gel:oil proportion for a vehicle having a viscosity of M-N ranged from about 21.5:78.5 to about 22.5:77.5; whereas for a viscosity of X-Y, the proportion ranged from about 51:49 to about 53:47. These vehicles were designated as "SOY II".

EXAMPLE 6

By substituting cottonseed oil for soybean oil in the procedures of Examples 1, 2, and 5, cottonseed oil-based vehicles designated "COT I(a1)", "COT I (a2)", and "COT II", respectively, were obtained. Individual viscosity values are given in Table VI below.

EXAMPLE 7

By substituting canola oil for soybean oil in the procedures of Examples 1, 2, and 5, canola oil-based vehicles designated "CAN I (a1)", "CAN I (a2)", and "CAN II", respectively, were obtained. Individual viscosity values are given in Table VI below.

EXAMPLE 8

By substituting safflower seed oil for soybean oil in the procedures of Examples 1, 2, and 5, safflower oil-based vehicles designated "SAF I(a1)", "SAF I (a2)", and "SAF II", respectively, were obtained. Individual viscosity values are given in Table VI below.

EXAMPLE 9

By substituting sunflower seed oil for soybean oil in the procedures of Example 1, 2, and 5, sunflower oil-based vehicles designated "SUN I(a1)", "SUN I(a2)", and "SUN II", respectively, were obtained. Individual viscosity values are given in Table VI below.

EXAMPLE 10

Molecular weights ($\overline{Mw}$) for various heat bodied oil vehicles described in Examples 1, 2, and 6–9 were determined by gel permation chromatography. Correlation between Gardner-Holdt Scale viscosities and molecular weight are given in Table II below.

Molecular weight ($\overline{Mw}$) of the vegetable oil gels prepared in Examples 5–9 were also determined by gel permeation chromatography. These values are given in Table III below.

EXAMPLE 11

Soybean oil vehicles prepared by the methods of Examples 1 and 5, and other vegetable oil vehicles prepared by the methods of Examples 6–9, were evaluated for color using the Gardner Color Scale. The results are presented in Table IV below in comparison to the color values for ANPA soybean oil vehicles with 22–27% Picco resin used for black and colored ink formulations.

EXAMPLES 12–79

Black printing inks were formulated from the vehicles prepared in Examples 1–9 by heating the vehicle to 65°–70° C. and then blending with 1.0% butylated hydroxytoluene (BHT) and 6–20% carbon black ("Elftex 8"). The elevated temperature was needed to dissolve the BHT. Dispersion of the pigment was accomplished with a "Shar High Speed Dispersers" operated at 2500–3000 rpm over a period of 5–7 hrs. Proper dispersion was assured by checking each formulation with a "NP1R1 Production Gindometer".

Viscosities of the inks were measured by means of a "Laray Falling Rod Viscometer"; and tacks were measured with an "Electronic Inkometer".

Vehicle viscosity, pigment level, ink formulation, tack and viscosity, and in some cases, prospective application are given in Table V for the soybean oil-based inks (Example 12–58). Similar data are given in Table VI for the inks prepared from cottonseed, canola, safflower, and sunflower seed oils (Examples 59–79).

EXAMPLE 80

Certain formulations in Table V considered to be candidates for offset lithography were evaluated for resistance to ruboff by the ANPA-NAPIM ruboff standard test procedure. Ruboff is defined as the unwanted transfer of ink from the printed page to another surface. The amount of ruboff is monitored by the percent blackness of a stain that results by rubbing a tissue with a given pressure over the surface of a printed sheet. Dark black stains indicate the potential transfer of the ink pigment to the hands of the reader whereas light gray stains indicate the potential of the ink pigment to remain on the printed page. The percent improvement determines the rate of pigment fixation on the newsprint by either penetration into the sheet or resin hardening. A percent blackness of less than 6% after 2 hrs is considered characteristic of an ink with good ruboff resistance.

All formulations, except that of Example 34, had lower ruboff values than the ANPA soybean oil ink. Eleven of the 17 formualtions tested showed a percent blackness of less than 6% after 2 hrs. The results are reported in Table VII below.

EXAMPLES 81-87

Yellow inks were prepared by formulating SOY I (a1) type vehicles of various viscosities with yellow pigment. Lower viscosity vehicles were selected for higher pigment levels in order to achieve ink viscosities in the range of about 16-28 poises. In some cases, a thickening agent ("Bentone") was added in an amount of 0.5-2% as an optional agent to adjust the viscosity. An ANPA soybean oil (SBO) yellow ink formulated for 55.0% alkali-refined soybean oil, 17.0% "Picco 5140" resin, 2.1% thickening agent, and 25.9% yellow pigment was also evaluated. Absolute print density was measured using an "X-Rite 428 Computerized Color Reflection Densitometer". Properties of the inks are reported in Table VIII.

EXAMPLES 88-94

Red inks were prepared by formulating SOY I (a1) type vehicles of various viscosities with magenta pigment. Lower viscosity vehicles were selected for higher pigment levels in order to achieve ink viscosities in the range of about 16-28 poises. In some cases a thickening agent ("Bentone") was added in an amount of 0.5-2% as an optional agent to adjust the viscosity. An ANPA soybean oil (SBO) blue ink formulated from 51.1% alkali-refined soybean oil, 19.0% "Picco 5140" resin, and 27.1% pigment was also evaluated. Absolute print density was measured using an "X-Rite 428 Computerized Color Reflection Densitometer". Properties of the inks are reported in Table IX.

EXAMPLES 95-101

Blue inks were prepared by formulating SOY I (a1) type vehicles wit cyan pigment. In some cases, either 2.0 or 5.0% thickening agent ("Bentone") was added to adjust the viscosity, and up to 20% "Hydrite R" was employed as an optical brightner. Also evaluated were: (1) an ANPA soybean oil (ANPA SBO) blue ink formulated with an alkali-refined soybean oil-30% "Picco 5140" resin blend, "Bentone", and "Hydrite R"; and (2) a similar formulation (SBO) without the "Hydrite R". The results are reported in Table X.

TABLE I

| | Heat Bodied Oil Blends | | | |
|---|---|---|---|---|
| | Soybean oil component (% w/w) | | | |
| Vehicle designation | Heat bodied 1 | Heat bodied 2 | Unmod.[a] 3 | Vehicle viscosity[b] |
| SOY I (c1) | 25 (X-Y)[c] | 75 (G-H) | 0 | M-N |
| SOY I (c2) | 15 (X-Y) | 85 (I-J) | 0 | M-N |
| SOY I (c3) | 50 (X-Y) | 0 | 50 | M-N |
| SOY I (c4) | 34 (Z$_8$-Z$_9$) | 26.6 (U-V) | 39.4 | M-N |
| SOY I (c5) | 70 (Z$_3$-Z$_4$) | 0 | 30 | W-X |
| SOY I (c6) | 32.5 (Z$_8$-Z$_9$) | 0 | 67.5 | W-X |

[a] "Unmod" refers to unmodified alkali-refined soybean oils.
[b] Gardner-Holdt Viscosity Scale
[c] Letter values in parentheses represent Gardner-Holdt viscosities of heat bodied oils.

TABLE II

| Vehicle Molecular Weights | |
|---|---|
| Vehicle viscosity | Mw |
| <A (alkali-refined SBO) | 1428 |
| G-H | 2656 |
| M-N | 3757 |
| T-U | 4991 |
| U-V | 5133 |
| V | 6030 |
| W | 6193 |
| W-X | 7208 |
| X-Y | 8851 |

TABLE III

| Gel Molecular Weights | |
|---|---|
| Gel | Mw |
| soybean | 60,423 |
| cottonseed | 42,696 |
| canola | 44,424 |
| safflower | 31,772 |
| sunflower | 15,055 |

TABLE IV

| Vehicle Color Evaluation | | | | | | |
|---|---|---|---|---|---|---|
| | Vehicle Color[b] | | | | | |
| Vehicle viscosity[a] | Soybean[c] (Ex. 1, 5) | Cottonseed (Ex 6) | Canola (Ex. 7) | Safflower (Ex. 8) | Sunflower (Ex. 9) | ANPA |
| W | 4 | 5 | 6-7 | 3 | 3-4 | |
| W-X | 4 | 6 | 7 | 3-4 | 4 | |
| X-Y | 4 | 6 | 7 | 3-4 | 4 | |
| | | | | | | 14 |

[a] Gardner-Holdt Viscosity Scale
[b] Gardner Color Scale
[c] Soybean oil viscosities of G-V have color values in the range of 1-4.

TABLE V

| | Ink Formulations | | | |
|---|---|---|---|---|
| Example | Vehicle | Vehicle viscosity[a] | Pigment (% w/w)[b] | Ink tack (g-m)[c] | Ink viscosity (poises)[d] |
| 12 | SOY I (a1) | G-H | 19.8 | 2.3-2.4 | 7.33 |
| 13 | SOY I (a1) | I-J | 19.8 | 2.8-2.9 | 10.08 |
| 14 | SOY I (a1) | M-N | 19.8 | | |
| 15 | SOY I (a1) | M-N | 15.0 | 2.8 | 7.40 |
| 16 | SOY I (a1) | M-N | 12.0 | 2.7-2.8 | 6.30 |
| 17 | SOY I (a1) | M-N | 10.0 | 2.5 | 5.26 |
| 18 | SOY I (a1) | T-U | 19.8 | 4.1-4.2 | 16.58 |
| 19 | SOY I (a1) | T-U | 12.0 | 3.4-3.5 | 10.36 |
| 20 | SOY I (a11) | T-U | 10.0 | 2.9-3.0 | 7.27 |
| 21 | SOY I (a1) | T-U | 8.0 | 2.9 | 7.06 |
| 22 | SOY I (a1) | T-U | 6.0 | 2.9 | 6.88 |
| 23 | SOY I (a1) | U-V | 19.8 | 4.5-4.6 | 19.04 |
| 24 | SOY I (a1) | U-V | 9.0 | 3.4 | 11.23 |
| 25 | SOY I (a1) | U-V | 6.0 | 3.0 | 9.79 |
| 26 | SOY I (a1) | V | 19.8 | 5.0 | 23.38 |
| 27 | SOY I (a1) | V | 18.0 | 4.8-4.9 | 23.71 |
| 28 | SOY I (a1) | V | 17.0 | 4.6 | 20.95 |
| 29 | SOY I (a1) | V | 15.0 | 4.2 | 15.55 |
| 20 | SOY I (a1) | V | 10.0 | 3.5 | 12.37 |
| 31 | SOY I (a1) | V | 8.0 | 3.5 | 11.77 |
| 32 | SOY I (a1) | W | 19.8 | 5.3-5.4 | 27.65 |

TABLE V-continued

| Example | Vehicle | Vehicle viscosity[a] | Pigment (% w/w)[b] | Ink tack (g-m)[c] | Ink viscosity (poises)[d] |
|---|---|---|---|---|---|
| 33 | SOY I (a1) | W | 15.0 | 4.7 | 19.46 |
| 34 | SOY I (a1) | W-X | 19.8 | 6.7 | 33.78 |
| 35 | SOY I (a1) | W-X | 15.0 | 5.4 | 23.38 |
| 36 | SOY I (a1) | W-X | 12.0 | 4.6–4.7 | 18.80 |
| 37 | SOY I (a1) | W-X | 11.0 | 4.3–4.4 | 18.37 |
| 38 | SOY I (a1) | W-X | 10.0 | 3.9–4.0 | 14.56 |
| 39 | SOY I (a1) | X-Y | 19.8 | 7.0–7.1 | 41.30 |
| 40 | SOY I (a1) | X-Y | 12.0 | 5.2–5.3 | 24.85 |
| 41 | SOY I (a1) | X-Y | 10.0 | 4.8–4.9 | 22.48 |
| 42 | SOY I (a1) | X-Y | 8.0 | 4.6–4.7 | 21.10 |
| 43 | SOY I (a2) | W-X | 12.0 | 4.5 | 19.56 |
| 44 | SOY I (a2) | X-Y | 10.0 | 5.0 | 25.01 |
| 45 | SOY I (b1) | U-V | 12.0 | 4.2 | 24.28 |
| 46 | SOY I (b1) | W-X | 12.0 | 4.9 | 19.96 |
| 47 | SOY I (d1) | M-N | 19.8 | 3.1–3.2 | 12.24 |
| 48 | SOY I (d2) | M-N | 19.8 | 2.7–2.8 | 13.14 |
| 49 | SOY I (d3) | M-N | 19.8 | 3.0 | 14.09 |
| 50 | SOY I (d4) | M-N | 19.8 | — | 46.17 |
| 51 | SOY I (d5) | W-X | 12.0 | 4.5 | 22.06 |
| 52 | SOY I (d6) | W-X | 12.0 | — | — |
| 53 | SOY II | M-N | 12.0 | 2.6 | 6.22 |
| 54 | SOY II | T-U | 10.0 | 2.9 | 7.44 |
| 55 | SOY II | W-X | 12.0 | 4.5 | 20.38 |
| 56 | SOY II | W-X | 10.0 | 3.9–4.0 | 16.60 |
| 57 | SOY II | X-Y | 12.0 | 5.2–5.3 | 24.14 |
| 58 | SOY II | X-Y | 10.0 | 4.9 | 21.47 |
|  | ANPA soy ink |  | 19.8 | 3.6 | 16.45 |
|  | ANPA soy ink |  | 12.5 | 2.6–2.7 | 6.10 |

[a]Gardner-Holdt Viscosity Scale.
[b]Carbon black ("Elftex 8").
[c]Measured by "Electronic Inkometer".
[d]Measured by "Laray Falling Rod Viscometer".

TABLE VI

| Example | Vehicle | Vehicle viscosity[a] | Pigment (% w/w)[b] | Ink tack (g-m)[c] | Ink viscosity (poises)[d] |
|---|---|---|---|---|---|
| 59 | COT I (a1) | W | 15.0 | 4.7 | 21.22 |
| 60 | COT I (a1) | W-X | 12.0 | 4.6–4.7 | 23.95 |
| 61 | COT I (a1) | X-Y | 10.0 | 4.9 | 22.43 |
| 62 | COT I (a2) | X-Y | 10.0 | 4.7–4.8 | 25.72 |
| 63 | COT II | W-X | 12.0 | 4.7 | 19.72 |
| 64 | CAN I (a1) | W | 15.0 | 4.7–4.8 | 20.39 |
| 65 | CAN I (a1) | W-X | 12.0 | 4.5–4.6 | 19.30 |
| 66 | CAN I (a1) | X-Y | 10.0 | 4.9 | 20.77 |
| 67 | CAN I (a2) | W-X | 12.0 | 4.5–4.6 | 19.32 |
| 68 | CAN II | W-X | 12.0 | 4.7 | 21.53 |
| 69 | SAF I (a1) | W | 15.0 | 4.9 | 20.77 |
| 70 | SAF I (a1) | W-X | 12.0 | 4.5–4.6 | 17.90 |
| 71 | SAF I (a1) | X-Y | 10.0 | 4.9–5.0 | 24.67 |
| 72 | SAF I (a2) | W | 15.0 | 4.9 | 20.15 |
| 73 | SAF II | W-X | 12.0 | 4.5 | 19.11 |
| 74 | SUN I (a1) | W | 15.0 | 4.9–5.0 | 23.13 |
| 75 | SUN I (a1) | W-X | 12.0 | 4.5–4.6 | 18.43 |
| 76 | SUN I (a1) | X-Y | 10.0 | 5.0 | 23.93 |
| 77 | SUN I (a2) | W | 15.0 | 4.7–4.8 | 20.52 |
| 78 | SUN I (a2) | W-X | 12.0 | 4.5 | 18.72 |
| 79 | SUN II | W-X | 12.0 | 4.5–4.6 | 20.68 |

[a]Gardner-Holdt Viscosity Scale.
[b]Carbon black.
[c]Measured by "Electronic Inkometer".
[d]Measured by "Laray Falling Rod Viscometer".

TABLE VII

Ink Ruboff Resistance Evaluation

| Formulation example | Ruboff values as percent blackness Initial | After 2 hrs | Improvement (%) |
|---|---|---|---|
| 18 | 10.6 | 6.5 | 39 |
| 26 | 8.4 | 5.2 | 38 |
| 28 | 7.3 | 7.0 | 5 |
| 33 | 7.4 | 7.0 | 5 |
| 34 | 6.3 | 10.4 | −65 |
| 35 | 8.2 | 6.6 | 20 |
| 36 | 6.0 | 5.5 | 8 |
| 37 | 7.4 | 5.8 | 22 |
| 38 | 5.7 | 7.4 | −37 |
| 40 | 8.6 | 5.9 | 31 |
| 41 | 8.4 | 5.6 | 33 |
| 42 | 5.3 | 4.6 | 13 |
| 55 | 6.6 | 5.2 | 21 |
| 56 | 5.1 | 4.4 | 14 |
| 57 | 6.8 | 4.5 | 34 |
| 58 | 4.3 | 4.2 | 2 |
| ANPA SBO ink | 14.1 | 8.4 | 40 |

TABLE VIII

Yellow Inks

| Example | Vehicle | Vehicle viscosity | Thickening agent | Pigment % (w/w) | Print density | Ink tack (g-m) | Ink viscosity (poises) |
|---|---|---|---|---|---|---|---|
| 81 | SOY I (a1) | V | + | 20 | 1.14 | 4.7 | 23.46 |
| 82 | SOY I (a1) | W | + | 17 | 1.09 | 4.7 | 21.88 |
| 83 | SOY I (a1) | W-X | + | 15 | 1.08 | 4.6 | 21.78 |
| 84 | SOY I (a1) | X-Y | + | 12 | 1.08 | 5.0 | 27.77 |
| 85 | SOY I (a1) | X-Y | − | 12 | 1.07 | 4.2 | 19.08 |
| 86 | SOY I (a1) | X-Y | − | 10 | 1.06 | 4.1 | 15.09 |
| 87 | SOY I (a1) | Z-Z$_1$ | − | 12 | 1.08 | 4.9 | 31.24 |
| ANPA | SBO | M-N |  | 25.9 | 1.07 | 3.3 | 17.37 |

TABLE IX

Red Inks

| Example | Vehicle | Vehicle viscosity | Thickening agent | Pigment % (w/w) | Print density | Ink tack (g-m) | Ink viscosity (poises) |
|---|---|---|---|---|---|---|---|
| 88 | SOY I (a1) | V | − | 20.75 | 1.31 | 4.2 | 18.47 |
| 89 | SOY I (a1) | W | − | 16.75 | 1.25 | 4.0 | 16.07 |
| 90 | SOY I (a1) | W-X | − | 14.75 | 1.21 | 4.3 | 19.94 |
| 91 | SOY I (a1) | X-Y | + | 12.75 | 1.22 | 4.6 | 22.44 |
| 92 | SOY I (a1) | X-Y | + | 10.25 | 1.21 | 4.8 | 23.13 |
| 93 | SOY I (a1) | X-Y | − | 12.75 | 1.20 | 4.2 | 18.76 |
| 94 | SOY I (a1) | Z-Z$_1$ | − | 10.25 | 1.19 | 5.1 | 27.17 |

TABLE IX-continued

Red Inks

| Example | Vehicle | Vehicle viscosity | Thickening agent | Pigment % (w/w) | Print density | Ink tack (g-m) | Ink viscosity (poises) |
|---|---|---|---|---|---|---|---|
| ANPA | SBO | R-S | — | 27.1 | 1.32 | 4.6–4.7 | 28.45 |

TABLE X

Blue Inks

| Example | Vehicle | Vehicle viscosity | Thickening agent (% w/w) | Optical brightner (% w/w) | Pigment (% w/w) | Print density | Ink tack (g-m) | Ink viscosity (poises) |
|---|---|---|---|---|---|---|---|---|
| 95 | SOY I (a1) | V | 5.0 | 18.3 | 9.1 | 1.25 | 4.3 | 25.92 |
| 96 | SOY I (a1) | V | 5.0 | — | 9.1 | 1.31 | 4.4 | 23.10 |
| 97 | SOY I (a1) | V | 5.0 | 10.0 | 9.1 | 1.29 | 4.4 | 21.28 |
| 98 | SOY I (a1) | X-Y | 2.0 | 20.0 | 7.0 | 1.20 | 4.6 | 29.38 |
| 99 | SOY I (a1) | Z-Z$_1$ | — | 10.0 | 5.0 | 1.09 | 4.2 | 21.05 |
| 100 | SOY I (a1) | Z$_1$-Z$_2$ | — | 10.0 | 5.0 | 1.16 | 6.1 | 38.87 |
| 101 | SOY I (a1) | Z$_1$-Z$_2$ | — | 20.0 | 5.0 | 1.10 | 7.0 | 55.62 |
| ANPA | SBO | U-V | 5.0 | 18.3 | 9.1 | 1.19 | 4.1–4.2 | 27.26 |
|  | SBO | U-V | 5.0 | — | 9.1 | 1.21 | 4.1–4.2 | 22.47 |

It is understood that the foregoing detailed description is given merely by way of illustration and that modification and variations may be made therein without departing from the spirit and scope of the invention.

We claim:

1. A printing ink formulation comprising a vehicle consisting essentially of a substantially non-oxidized heat bodied vegetable oil, said vehicle having a molecular weight in the range of about 2600–8900, a viscosity in the range of about 1.6–18 poises, and a color on the Gardner Color Scale of about 6 or less.

2. A printing ink formulation as described in claim 1 wherein said vegetable oil is selected from the group consisting of soybean oil, cottonseed oil, canola oil, sunflower oil, and safflower oil.

3. A printing ink formulation as described in claim 1 wherein said vegetable oil is soybean oil.

4. A printing ink formulation as described in claim 1 wherein said color is in the range of about 2–4.

5. A printing ink formulation as describe din claim 1 further comprising an effective amount of a pigment to achieve a color density.

6. A printing ink formulation as described in claim 5 wherein said pigment is carbon black.

7. A printing ink formulation as described in claim 5 wherein said pigment is a yellow pigment.

8. A printing ink formulation as described in claim 5 wherein said pigment is a blue pigment.

9. A printing ink formulation as described in claim 5 wherein said pigment is a red pigment.

10. A method for producing a printing ink vehicle from a vegetable oil comprising the following steps:

a. heating a vegetable oil at a temperature sufficient to produce a heat bodied, gel component having a molecular weight of at least about 15,000 under conditions which minimize oxidation and its consequent darkening effect on the oil;

b. combining the heat bodies, gel component with a second component of vegetable oil origin; and c. recovering a printing ink vehicle characterized by a viscosity in the range of about 1.6–18 poises, and a color on the Gardner Color Scale of about 6 or less.

11. A method as described in claim 10 wherein the second component of vegetable oil origin in step (b) is an unmodified vegetable oil.

12. A method as described in claim 10 wherein the heating in step (a) is conducted in the range of 325°–335° C. in an inert atmosphere.

13. A method as described in claim 10 wherein the vegetable oil is selected from the group consisting of soybean oil, cottonseed oil, canola oil, sunflower oil, and safflower oil.

14. A product produced by the process of claim 10.

15. A product produced by the process of claim 11.

16. A product produced by the process of claim 12.

17. A product produced by the process of claim 13.

18. A printing ink formulation comprising a vehicle consisting essentially of the product of claim 14 and an effective amount of a pigment to achieve to color density.

19. A printing ink formulation comprising a vehicle consisting essentially of the product of claim 15 and an effective amount of a pigment to achieve color density.

20. A printing ink formulation comprising a vehicle consisting essentially of the product of claim 16 and an effective amount of a pigment to achieve a color density.

21. A printing ink formulation comprising a vehicle consisting essentially of the product of claim 17 and an effective amount of a pigment to achieve to color density.

* * * * *

UNITED STATES PATENT AND TRADEMARK OFFICE
CERTIFICATE OF CORRECTION

PATENT NO. : 5,122,188
DATED : June 16, 1992
INVENTOR(S) : Sevim Z. Erhan and Marvin O. Bagby It is certified that error appears in the above-identified patent and that said Letters Patent is hereby corrected as shown below:

Column 2, line 50, delete "Yhe" and insert -- The -- .
Column 3, line 49, delete "bodies" and insert -- bodied -- .
Column 4, line 18, delete "inks" and insert -- Inks -- .
Column 5, line 25, delete "$Z_814Z_9$" and insert -- $Z_8$-$Z_9$ -- .
Column 6, lines 43, delete "Dispersers" and insert --Disperser--;
Column 6, line 46, delete "Gindometer" and insert -- Grindometer -- .
Column 7, line 49, delete "wit" and insert -- with -- .

Column 11, line 45, delete "describe din" and insert -- described in -- .
Column 12, line 25, delete "bodies" and insert -- bodied -- .

Signed and Sealed this

Thirty-first Day of August, 1993

Attest:

BRUCE LEHMAN

*Attesting Officer*    *Commissioner of Patents and Trademarks*